Jan. 28, 1958  T. W. PODGAJNY  2,821,152
HIGHWAY VEHICLE CARRYING CAR
Filed Oct. 29, 1954  2 Sheets-Sheet 1

INVENTOR.
Thaddeus W. Podgajny
BY Rodney Bedell
atty.

Jan. 28, 1958 T. W. PODGAJNY 2,821,152
HIGHWAY VEHICLE CARRYING CAR
Filed Oct. 29, 1954 2 Sheets-Sheet 2

INVENTOR.
Thaddeus W. Podgajny
BY
Rodney Bedell
atty.

United States Patent Office 2,821,152
Patented Jan. 28, 1958

2,821,152

HIGHWAY VEHICLE CARRYING CAR

Thaddeus W. Podgajny, Wilmington, Del., assignor to General Steel Castings Corporation, Granite City, Ill., a corporation of Delaware Application October 29, 1954, Serial No. 465,574

1 Claim. (Cl. 105—368)

The invention relates to railway rolling stock and more particularly to a car adapted to mount a highway trailer or similar wheeled vehicle.

The main object of the invention is to adapt the car floor to form a flat surface from side to side of the car, to accommodate ordinary merchandise, and to form upstanding guides spaced apart transversely of the car and extending lengthwise of the car to facilitate the loading and unloading of one or more wheeled vehicles which may be moved onto the car from one end of the car.

In the accompanying drawings illustrating a selected embodiment of the invention, Figure 1 is a side elevation of one half of a railway car showing a highway trailer mounted thereon.

Figure 1:
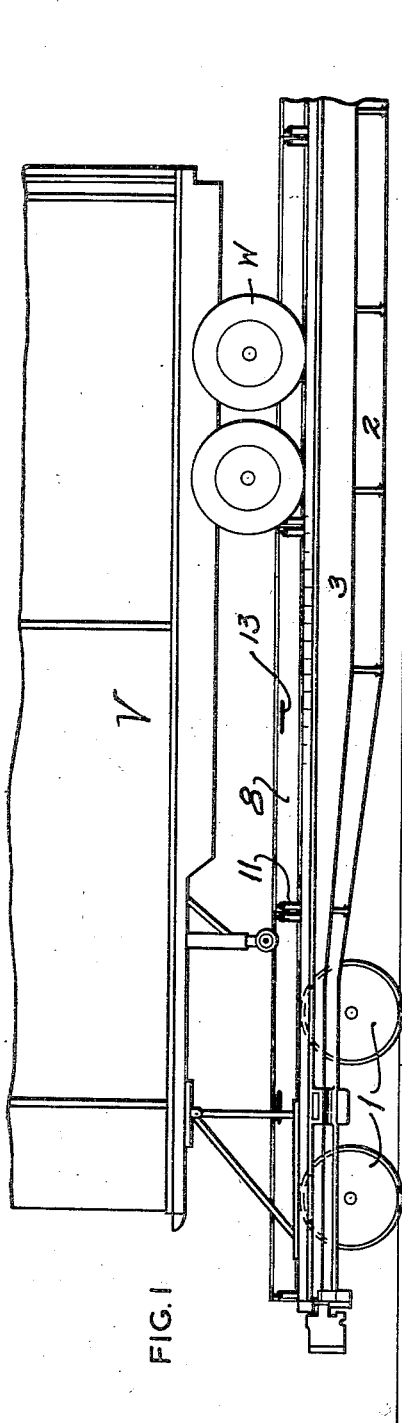
Figure 2:
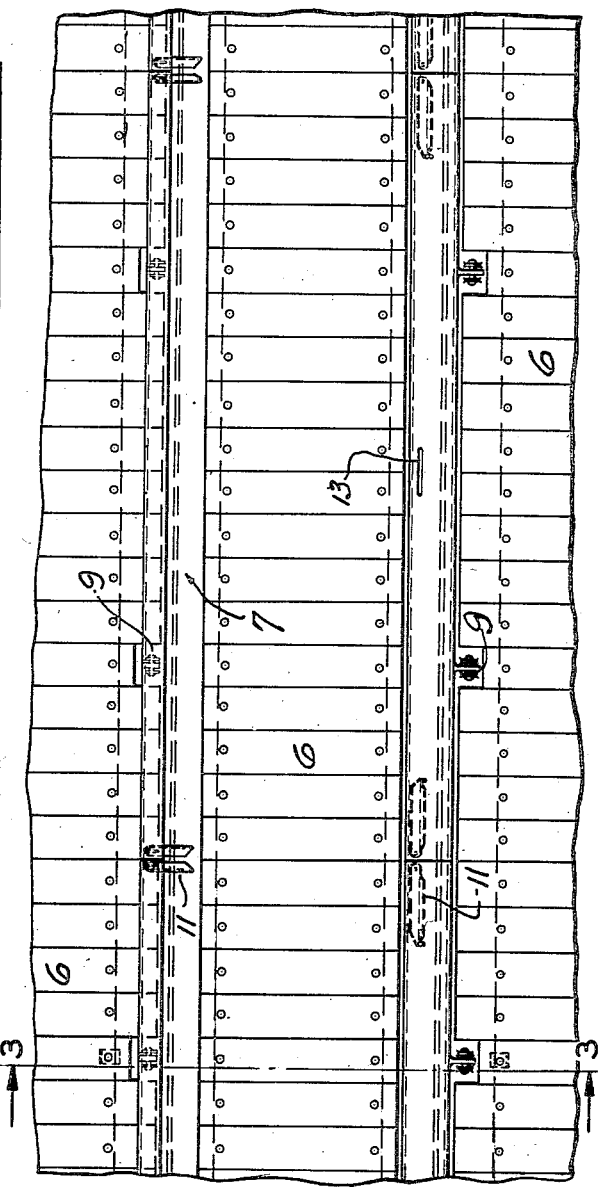
Figure 2 is a top view of a portion of the car floor but drawn to an enlarged scale.

The car includes the usual trucks near opposite ends, indicated by the wheels 1, and an underframe shown as a casting having center or intermediate sills 2, and side sills 3, there being wide flanges 4 and 5 on the center sills and side sills respectively.

Wood flooring 6 is carried on flanges 4 and 5. Flanges 4, 5 and flooring 6 constitute a floor structure extending from side to side of the car and from end to end of the car but substantially throughout the length of the car the floor structure is recessed at 7. A series of structural steel channels 8 are pivoted to the floor structure at intervals lengthwise of the car, as indicated at 9, and are movable about their pivots from a lowered position, shown at the right hand side of Figure 3, to a raised position, shown at the left hand side of Figure 3. In the lowered position each channel web forms a substantial continuation of the top surface of the flooring and the channel flanges project downwardly from the web and rest upon a flange 4. In the raised position, the channel web is upright and the channel flanges extend horizontally towards the center of the car.

Each channel is provided with diagonals 10 at intervals. Associated with each diagonal is a strut 11 apertured at one end to receive the diagonal and movable about the joint thus formed to support the channel in raised position, as shown at the left hand side of Figure 3, the relative position of the parts being maintained preferably by the insertion of a tongue 12 on the other end of the strut into an opening provided therefor in the adjacent flange 4.

Figure 3:
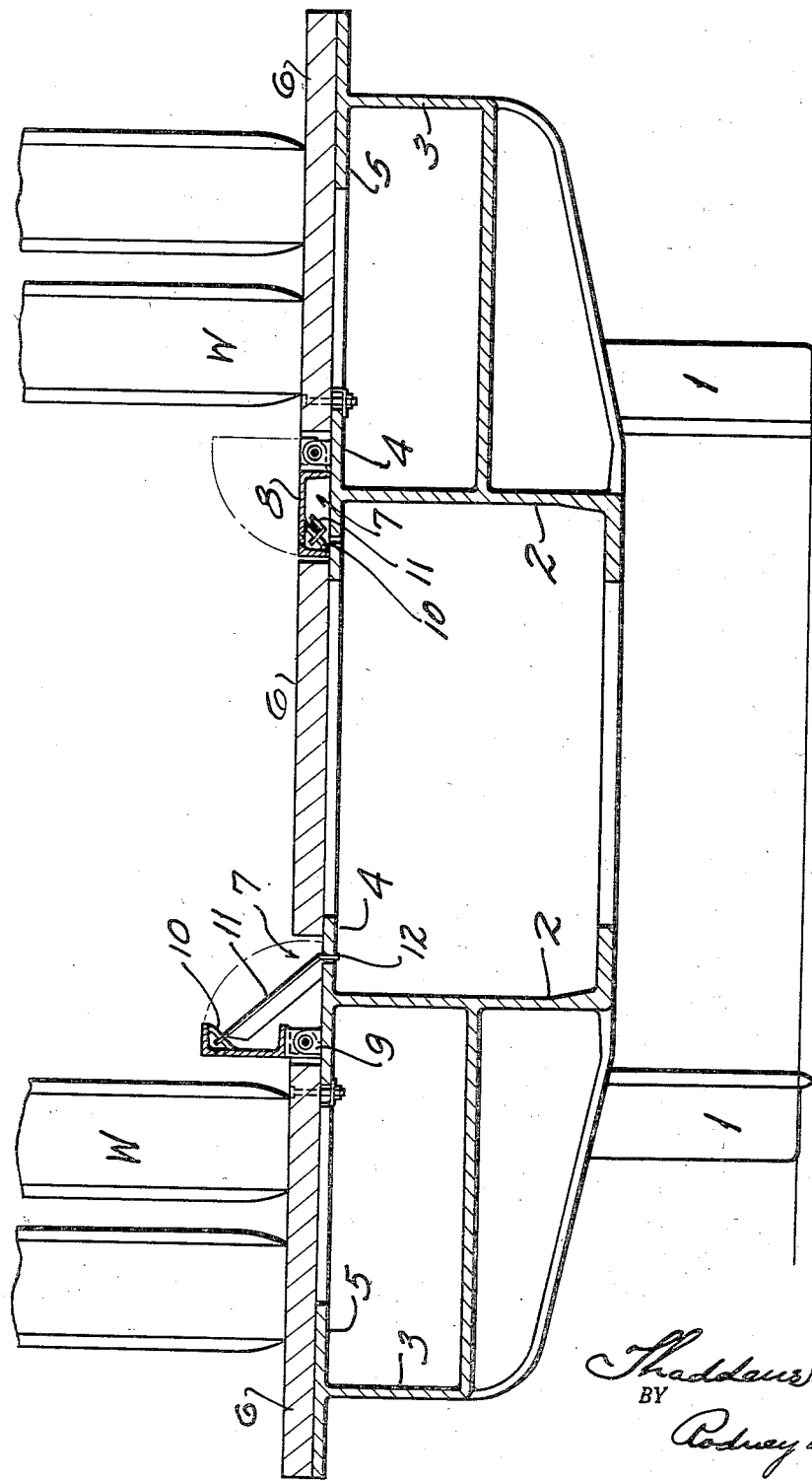
Figure 3 is a vertical transverse section taken approximately on the line 3—3 of Figure 2.

By moving the upright channel to raise strut 11, the latter may be freed from the flange, swung lengthwise of the channel into a position substantially parallel to the length of the channel, and the channel may then be dropped into the position shown at the right hand side of Figure 3 with strut 11 disposed beneath the channel web and between the channel flanges.

With this arrangement, and with the channels in raised position, a wheeled vehicle, as shown at B, may be moved along the car and its wheels W will be guided by the channels so that the vehicle will not be run off the sides of the car.

The individual channels have hand holds 13 at intervals whereby they may be readily grasped manually or with a tool and lifted from the lowered position to the raised position.

The wheel guides may consist of flat bars or wooden planks and may be pivoted to different parts of the car flooring than indicated in the drawings and may be of different lengths and are not necessarily continuous from end to end of the car.

These and other variations in the structure may be embodied without departing from the spirit of the invention and the exclusive use of those modifications coming within the scope of the claim is contemplated.

What is claimed is:

In a railway car, a floor structure having a recess extending lengthwise of the car, a channel iron extending lengthwise of the car, the width of said recess exceeding the width of said channel iron and the depth of said recess approximating the width of said channel iron flanges, pivotal mountings at intervals on said floor structure adjacent one side of said recess each connected to one flange of the channel iron whereby the channel iron is movable about said mountings to a position with its web upright and extending upwardly above the floor structure and forming a guide for vehicle wheels movable over said floor structure alongside said recess, and is movable to a position with its web horizontal and the edges of its flanges resting on the bottom of said recess, diagonals at intervals lengthwise of the channel iron each extending between and secured to points on the channel iron web and the other flange of the channel iron, said floor structure having apertures in the surfaces defining said recess and spaced from said pivotal mountings, and struts each having an aperture at one end receiving one of said diagonals and movable at its other end about the diagonal as a pivot to a position extending transversely of the length of the channel iron to engage in one of said apertures and thereby hold the channel iron upright, and to a position extending lengthwise of the channel iron between channel iron flanges and thereby accommodate lowering of the channel iron into said recess.

References Cited in the file of this patent

UNITED STATES PATENTS

| | | |
|---|---|---|
| 803,194 | Sage | Oct. 31, 1905 |
| 2,099,288 | Allen | Nov. 16, 1937 |
| 2,144,081 | Porte | Jan. 17, 1939 |
| 2,366,709 | Dean | Jan. 9, 1945 |
| 2,385,062 | Ditchfield | Sept. 18, 1945 |
| 2,695,113 | Jones et al. | Nov. 23, 1954 |